(12) United States Patent
Kramer et al.

(10) Patent No.: US 9,416,511 B2
(45) Date of Patent: Aug. 16, 2016

(54) WORKING PLATFORM FOR AN OFFSHORE WIND ENERGY PLANT AND METHOD FOR MANUFACTURING THE SAME

(71) Applicant: AREVA Wind GmbH, Bremerhaven (DE)

(72) Inventors: Thomas Kramer, Brake (DE); Michael Gennrich, Weyhe (DE)

(73) Assignee: AREVA Wind GmbH, Bremerhaven (DE)

( * ) Notice: Subject to any disclaimer, the term of this patent is extended or adjusted under 35 U.S.C. 154(b) by 194 days.

(21) Appl. No.: 14/353,589

(22) PCT Filed: Oct. 24, 2012

(86) PCT No.: PCT/EP2012/071015
§ 371 (c)(1),
(2) Date: Jun. 26, 2014

(87) PCT Pub. No.: WO2013/060703
PCT Pub. Date: May 2, 2013

(65) Prior Publication Data
US 2015/0292175 A1    Oct. 15, 2015

(30) Foreign Application Priority Data

Oct. 24, 2011    (EP) .................................. 11186413

(51) Int. Cl.
*E02B 17/00* (2006.01)
*F03D 1/00* (2006.01)
(Continued)

(52) U.S. Cl.
CPC ............. *E02B 17/0004* (2013.01); *B23K 31/02* (2013.01); *E02B 17/0026* (2013.01); *E02B 17/027* (2013.01); *E04H 12/34* (2013.01); *F03D 1/001* (2013.01); *F03D 1/003* (2013.01); *F03D 13/20* (2016.05); *E02B 2017/0056* (2013.01); *E02B 2017/0065* (2013.01); *F05B 2230/232* (2013.01); *F05B 2230/61* (2013.01);
(Continued)

(58) Field of Classification Search
CPC ... E02B 17/0026; E02B 17/027; E04H 12/34; F03D 1/003; F03D 11/04; F05B 2240/911; F05B 2240/95; Y02E 17/727
See application file for complete search history.

(56) References Cited

U.S. PATENT DOCUMENTS 3,768,016 A * 10/1973 Townsend et al. .............. 455/25
4,133,852 A *  1/1979 DiNicolantonio et al. 261/114.5
(Continued)

FOREIGN PATENT DOCUMENTS

CN    201952809 U    8/2011
CN    102840089 A    12/2012
(Continued)

OTHER PUBLICATIONS

Chinese Office Action dated Apr. 27, 2015 in Chinese Patent Application No. 201280052429.4.
(Continued)

*Primary Examiner* — Benjamin Fiorello
*Assistant Examiner* — Aaron Lembo
(74) *Attorney, Agent, or Firm* — Plumsea Law Group, LLC

(57) ABSTRACT

Working platform (6) and offshore wind energy plant (2) comprising a working platform (6), wherein the working platform (6) is configured to be mounted to an outside wall (16) of the tower (4) of the offshore wind energy plant (2) by help of welded joints.

9 Claims, 16 Drawing Sheets

(51) Int. Cl.
    *B23K 31/02*     (2006.01)
    *E02B 17/02*     (2006.01)
    *E04H 12/34*     (2006.01)

(52) U.S. Cl.
    CPC ....... *F05B2240/911* (2013.01); *F05B 2240/95* (2013.01); *Y02E 10/727* (2013.01); *Y02E 10/728* (2013.01); *Y02P 70/523* (2015.11)

(56) References Cited

U.S. PATENT DOCUMENTS

| | | | |
|---|---|---|---|
| 6,998,729 B1 | 2/2006 | Wobben | |
| 2004/0169376 A1* | 9/2004 | Ruer et al. | 290/55 |
| 2004/0262926 A1* | 12/2004 | Hansen | 290/44 |
| 2006/0104821 A1* | 5/2006 | Hall | 416/244 R |
| 2007/0007074 A1* | 1/2007 | Lemburg et al. | 182/128 |
| 2007/0269272 A1* | 11/2007 | Kothnur et al. | 405/195.1 |
| 2008/0118342 A1* | 5/2008 | Seidel et al. | 415/1 |
| 2008/0240864 A1* | 10/2008 | Belinsky | 405/223.1 |
| 2009/0289804 A1* | 11/2009 | Carstensen et al. | 340/601 |
| 2010/0135792 A1* | 6/2010 | Niehues | 416/1 |
| 2011/0006538 A1 | 1/2011 | Fischer et al. | |
| 2011/0129334 A1* | 6/2011 | Wu et al. | 415/126 |
| 2011/0135400 A1* | 6/2011 | Hall | 405/228 |
| 2011/0214596 A1* | 9/2011 | Wang | 114/265 |
| 2011/0248506 A1* | 10/2011 | Ruiz Urien et al. | 290/55 |
| 2011/0291853 A1* | 12/2011 | Riesberg et al. | 340/686.6 |
| 2015/0316024 A1* | 11/2015 | Larsen et al. | D1/3 |

FOREIGN PATENT DOCUMENTS

| | | |
|---|---|---|
| DE | 102006050900 | 4/2008 |
| DE | 102008029984 | 12/2009 |
| EP | 1269017 | 9/2006 |
| EP | 1918240 A1 | 5/2008 |
| JP | 2003527536 A | 9/2003 |
| JP | 2006207502 | 8/2006 |
| KR | 100998823 B1 | 12/2010 |
| KR | 20120106165 A | 9/2012 |

OTHER PUBLICATIONS

Japanese Office Action dated Apr. 21, 2015 in Japanese Patent Application No. 2014-537587.
Korean Office Action dated Mar. 23, 2015 in Korean Patent Application No. 10-2014-7013468.
International Preliminary Report on Patentability in connection with PCT/EP2012/071015 mailed Apr. 29, 2014.
International Search Report and Written Opinion mailed Oct. 9, 2013 in International Application No. PCT/EP2012/071015.
Taiwanese Office Action issued Dec. 5, 2014 in Taiwanese Patent Application No. 101139350.

* cited by examiner

WORKING PLATFORM FOR AN OFFSHORE WIND ENERGY PLANT AND METHOD FOR MANUFACTURING THE SAME

FIELD OF THE INVENTION

The invention relates to a working platform for an offshore wind energy plant and to an offshore wind energy plant having a working platform. Further, the invention relates to a method for manufacturing an offshore wind energy plant.

BACKGROUND

In general, working platforms for offshore wind energy plants are multi-purpose units. Mainly, the working platform provides access to the wind energy plant, e.g. for service engineers, and allows receiving service equipment or spare parts for the wind energy plant, e.g. from a supply ship. Today's working platforms are assembled using a very high number of separate components and hundreds of studs and screw connections. For instance, a typical working platform according to the prior art has approximately 700 screw connections. Every single screw and stud has to be inserted (i.e. hammered in) and subsequently tightened following a complex construction plan. Further, the screw connections have to be checked and re-torqued following a complex maintenance plan.

In order to comply with corrosion protection requirements, every single screw, which is exposed to the harsh offshore atmospheric conditions, has to be encapsulated using a special cap or seal. This is a cost-intensive process in terms of labor as well as in terms of material expenses.

However, despite of the above-mentioned considerable effort for corrosion protection, the screw and stud connections prone to errors and still represent the weak points in the construction work of the working platform. The screw connections are problematic with respect to strength and stability as well as with respect to resistance to corrosion of the working platform. According to the prior art, a tight maintenance schedule is necessary and the screw connections have to be checked in regular intervals and have to be replaced if necessary. This leads to high maintenance costs.

Further, the high number of separate components not only leads to complex assembly work of the working platform but also demands for an anti-corrosion treatment of every single component. An anti-corrosion treatment of a high number of separate components is a cost- and time-consuming process.

SUMMARY

It is an object of the invention to provide an improved working platform, offshore wind energy plant comprising a working platform and method of manufacturing an offshore wind energy plant.

According to an aspect of the invention, a working platform for an offshore wind energy plant is provided. The working platform is configured to be mounted on an outside wall of a tower of the offshore wind energy plant by help of welded joints. Preferably, the welded joints are the load-carrying joints connecting the working platform and the tower of the wind energy plant. Advantageously, no specific and extensive maintenance plan is necessary, due to the abandonment of screw connections. This leads to a reduction of maintenance costs for the working platform.

According to another advantageous aspect of the invention, the working platform comprises a plurality of pre-welded platform segments. In other words, there is a modular concept for the working platform which consists of a plurality of pre-welded platform segments. Advantageously, the assembly or manufacturing of the pre-welded platform segments may be performed at a manufacturing plant and not on site or under offshore conditions. This allows a very flexible design or construction and a very flexible production of the working platform. Customer specifications and requirements may be taken into account very easily.

Preferably, the pre-welded platform segments undergo an anti-corrosion treatment, e.g. by applying an anti-corrosion coating like a paint, a powder coating or an electro chemical process such as cathodic dip painting. Advantageously, the platform segments may be cabin-painted or factory treated using modern painting or coating technologies. This will result in a high-quality anti-corrosion coating which complies with the high offshore standards.

The modular concept of the working platform is further advantageous due to the following considerations. There might be a concept of mounting a complete working platform to the outside wall of a tower segment. However, the complete tower section including the working platform has to be coated with an anti-corrosion coating. Consequently, a huge painting cabin or equipment for coating is necessary, if high-quality standards shall be accomplished. These huge equipments, such as a huge painting cabin at the production facility will lead to very high expenses for the anti-corrosion treatment. On the other hand, by painting or coating the tower and the working platform in outdoor conditions, for example alongside the quay or on site under offshore conditions, the quality of the painting which is known from cabin painting or factory coating may not be reached. This will deteriorate the anti-corrosion concept and the high-quality standards for offshore facilities will probably not be accomplished. Prior art solutions apply many small components for manufacturing a working platform. This leads to a flexible design of the working platform. However, the assembly of the working platform has to be performed on site and is time-consuming and cost-intensive. The platform components may be painted in the production facility but the assembly has to be done by help of bolts. Moreover, the tolerances of the different components of the working platform are summing up and consequently the adjustment of the complete platform to the tower of the wind energy plant may be challenging especially under offshore conditions. Bolts have to be hammered in and tightened in a given order and with a given torque to complete the assembly which follows a complex assembly plan. During the assembly works, the anti-corrosion coating, i.e. the paint or coating, may be scratched or damaged which deteriorates the anti-corrosion concept.

Advantageously, the modular concept according to aspects of the invention provides a flexible and cost-effective working platform for offshore wind energy plants.

According to another aspect of the invention, the assembly and welding of the platform pre-welded platform segments may be performed by help of a dummy tower segment. Consequently, the manufactured platform segment will fit perfectly to the real tower section, which is identical to the dummy tower segment. This will simplify the assembly of the working platform on site. In a same way, for manufacture of a tower or a tower segment, a platform dummy and platform segment dummy may be used, respectively. This will help welding studs and flanges at the tower segment in the exact position where they will be needed. Advantageously, platform segments and tower segments can be manufactured in two different manufacturing plants, which opens up a pathway for a very flexible and cost effective production.

According to an advantageous embodiment of the invention, the platform segments of the working platform are constructed to have different load-bearing capacities. Advantageously, at least one of the platform segments is reinforced and constructed to have a higher load-bearing capacity in comparison to further platform segments of the working platform. Prior art working platforms are not designated to carry heavy loads, e.g. during exchange or replacement of heavy parts of the wind energy plant. In the modular concept according to aspects of the invention, this aspect may be taken into account. Depending on the envisaged load-bearing capacity, one or more platform segments may be reinforced, e.g. by help of additional beams. Advantageously, the reinforced segment may be designed to carry the load of a transformer of the wind energy plant. This will allow a replacement or upgrade of the transformer on site. A reinforced and heavy-duty platform segment may take the weight of the transformer during its exchange in case of maintenance or upgrade of the wind turbine.

In order to simplify the replacement of the transformer, the reinforced platform segment, according to another aspect of the invention, comprises at least one walk-on-able base plate, e.g. a checker plate, which is removable. Advantageously, this walk-on-able base plate may be painted using a certain color that is signaling that the respective base plate is removable. Further, the reinforced platform segment may be constructed to take up a heavy-load track system instead of the removable base plate. This heavy-load track system will be suitable for carrying a transformer during replacement thereof and will allow a fast and easy replacement or upgrade of the transformer.

According to another aspect of the invention, an offshore wind energy plant comprising a tower and a working platform is provided. The working platform according to aspects of the invention is mounted to an outside wall of the tower by help of welded joints. Advantageously, the working platform and the wall of the tower have corresponding fixed flanges, respectively. The flanges are for connecting the working platform and the wall of the tower by help of welded joints.

Advantageously and in contrast to the screwed connections which are known in the prior art, the flanges for welded joints offer the possibility to have a slight adjustment when mounting the platform segments to the tower. This is not the case for screwed connections, because the holes are typically pre-bored and therefore not changeable. Extra metal parts like washers or plates have to be used according to the prior art. Advantageously, these may be omitted during the assembly of the working platform according to aspects of the invention.

A surface of the working platform and a surface of the tower, except for the surface of the respective fixed flanges, may comprise an anti-corrosion coating. Advantageously, the anti-corrosion concept may be extended to the tower. In other words, the surface of the tower may be coated with the anti-corrosion coating at the production site and offshore works for applying the anti-corrosion coating may be minimized. This will improve the quality of the anti-corrosion protection.

Advantageously, the platform and platform segments, respectively, may have fixed flanges which correspond to further fixed flanges on the wall of the tower. The flanges are for connecting the platform and platform segment, respectively, and the tower, by help of welded joints. According to aspects of the invention, the surface of the platform, except for a surface of the fixed flanges, comprises an anti-corrosion paint or coating. In other words, almost the entire surface of the platform is coated with the anti-corrosion paint, coating or layer at the production site. Consequently, the additional offshore work which is needed to fulfill the anti-corrosion requirements is very limited. The weld seam between the flanges of the tower and the flanges of the working platform will be the only part which demands for an anti-corrosion treatment, i.e. an anti-corrosion coating. By way of an example only, the welded seam may be painted using a paint which is suitable for offshore processing. This will lead to a very cost-effective anti-corrosion concept having a high standard of quality.

The coating concept applies mutatis mutandis to the flanges that are fixed to the wall of the tower and to the flanges that are fixed to the working platform. Advantageously, these flanges may be fixed to a tower segment using welded studs. Such a stud may be a short portion of a hollow section beam. The tower segment may be cabin painted or factory coated at the production site, except for a surface of the fixed flanges. Using studs is advantageous because they allow spacing the flanges away from the tower surface. This may be advantageous for the assembly of the platform segments because there is easier access to the flanges of the tower and the working platform, respectively, during the welding process. Furthermore, heat transmission from the flange to the tower during welding may be minimized.

Further, the concept for replacement of heavy loads may be extended to the tower construction. According to another aspect of the invention, the heavy-load track system ranges from the reinforced platform segment into the interior of the tower. An inside structural system of the tower is constructed or designed to be reinforced by help of heavy-load beams for carrying an internal portion of the heavy-load track system.

According to another aspect of the invention, a method of manufacturing an offshore wind energy plant is provided. The wind energy plant comprises a tower and a working platform having a plurality of platform segments which are mountable on a wall of the tower. First, at least one platform segment is pre-welded. Subsequently, the at least one platform segment is welded on an outside wall of the tower to build up a load-bearing welding joint.

Advantageously, the surface of the at least one pre-welded platform segment may be coated with an anti-corrosion coating after pre-welding the respective platform segment and before welding the platform segment on the outside wall of the tower.

Further, welding of the platform segment on the outside wall of the tower may comprise welding of corresponding fixed flanges of the platform segment and the tower. The welded joint between the corresponding fixed flanges will build up the load-bearing welded joint between the working platform and the tower. The surface of the platform segments and/or the tower may be coated with an anti-corrosion coating except for the surface of the fixed flanges.

Same or similar advantages which have been already mentioned with respect to the working platform and the wind energy plant according to aspects of the invention also apply to the method of manufacturing an offshore wind energy plant.

BRIEF DESCRIPTION OF DRAWINGS

Further objects of the invention will ensue from the following description of example embodiments of the invention with reference to the accompanying drawings, wherein.

DETAILED DESCRIPTION OF EXAMPLE EMBODIMENTS

Figure 1:
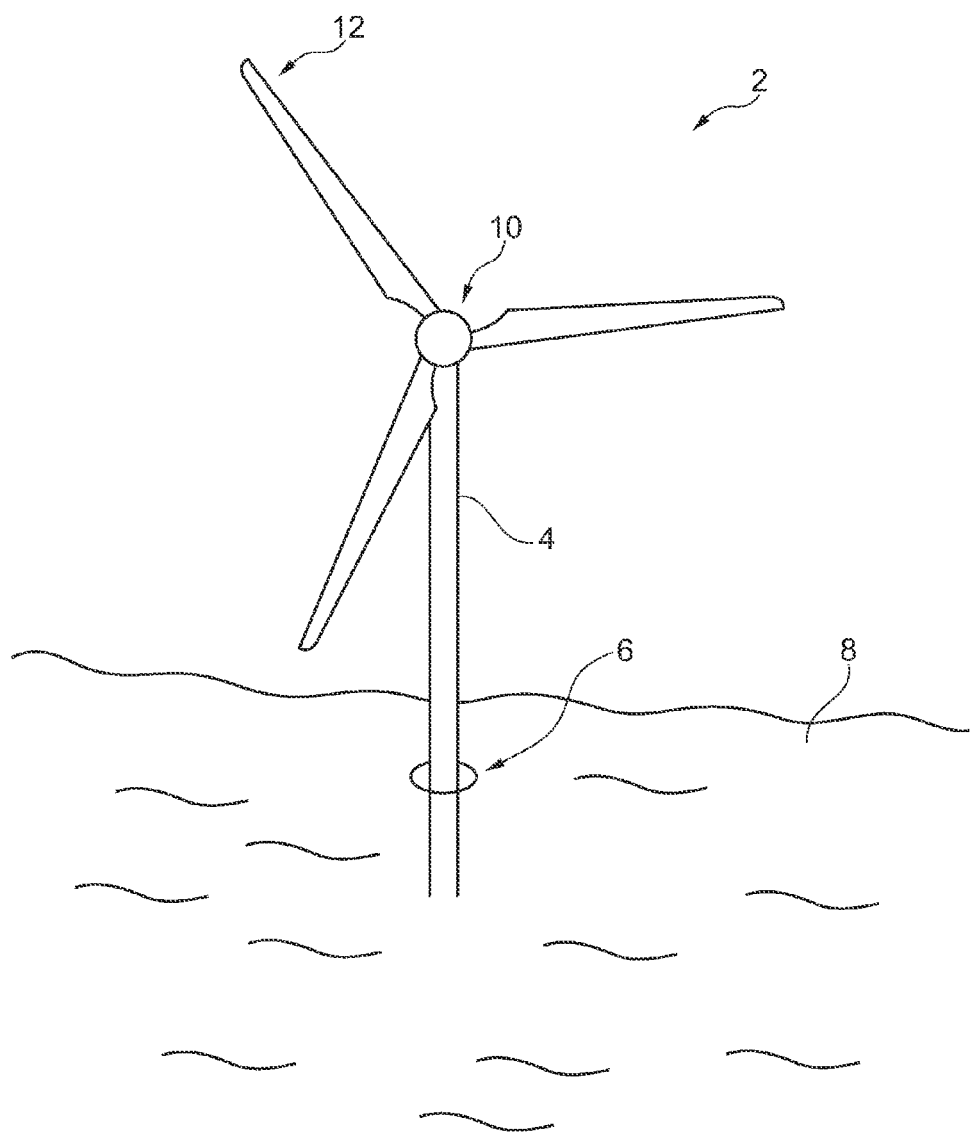
FIG. 1 is a simplified offshore wind energy plant, according to an embodiment of the invention.

FIG. 1 is a simplified offshore wind energy plant 2 having a tower 4 and a working platform 6. The tower 4 is build on suitable underwater foundations in the sea 8 and carries a rotor hub 10, which itself carries the rotor blades 12. A plurality of tower segments is assembled off shore during build up of the tower 4.

Figure 2:
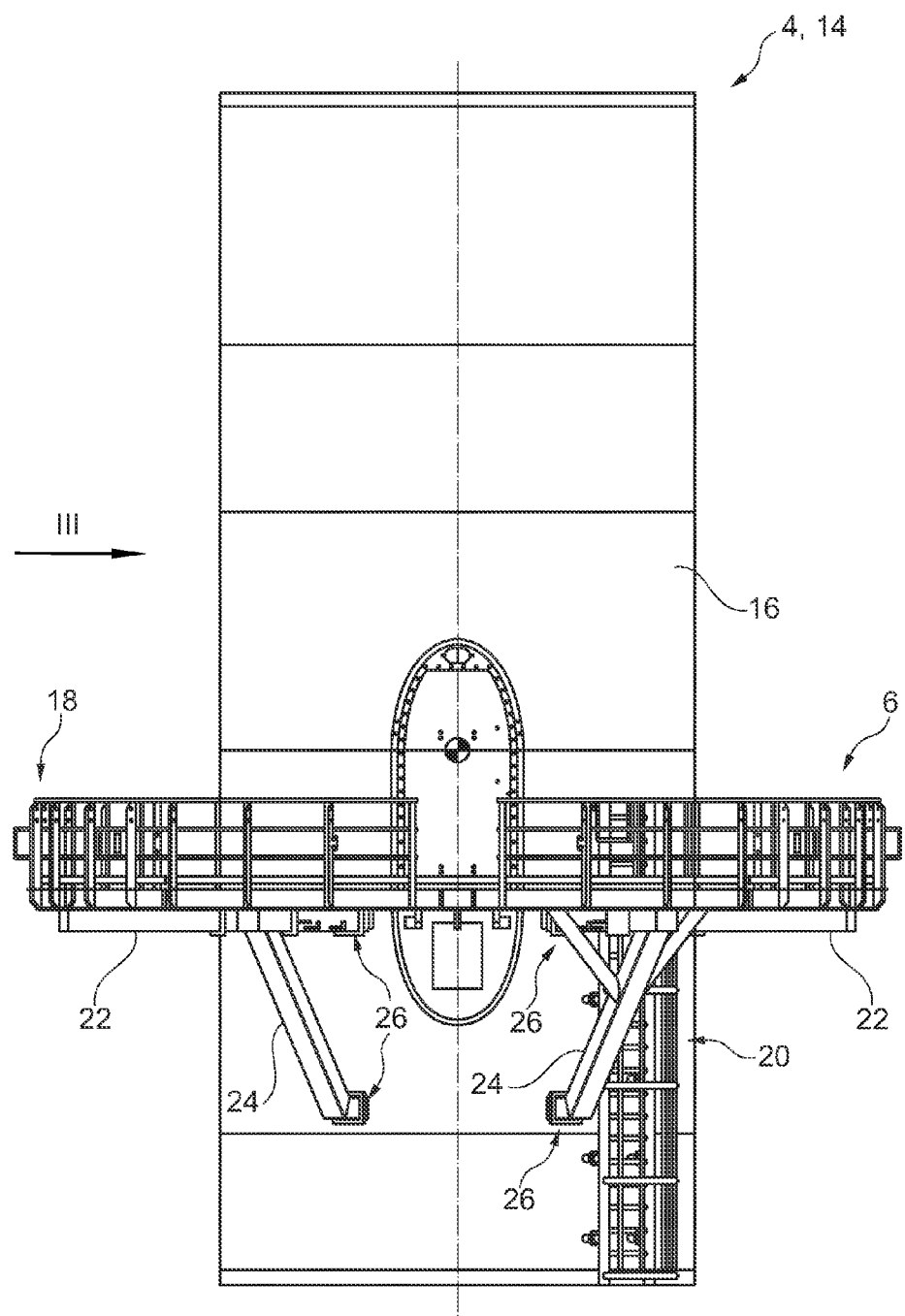
FIGS. 2 and 3 are simplified detailed views showing a wind energy plant, according to an embodiment of the invention.

FIG. 2 is a simplified detailed view showing a tower segment 14 and the working platform 6 which is welded to an outside wall 16 of the tower 4 and tower segment 14, respectively. The working platform 6 comprises a security handrail 18 which surrounds the working platform 6 at its outer perimeter. The working platform 6 is accessible by an ascending ladder 20 which is also welded to the wall 16 of the tower segment 14. Service engineers may enter the wind energy plant 2 via the working platform 6 using the ascending ladder 20. The working platform 6 is fixed to the tower segment 14 via radial beams 22 which are a part of the load bearing structure of the working platform 6. For normal, i.e. not reinforced, platform segments, the radial beams 22 are the only load carrying structure which is connected to the tower 4. Reinforced platform segments are supported and reinforced by help of additional support beams 24.

The tower segment 14 comprises a plurality of fixed flanges 26. Preferably, the fixed flanges 26 are welded on the wall 16 of the tower segment 14 using studs 15 (further details will be explained with reference to FIG. 4). The working platform 6 comprises a plurality of corresponding fixed flanges 26 which are preferably welded to the radial beams 22 and the support beams 24. The working platform 6 is fixed, i.e. welded, to the tower 4, i.e. the wall 16 of the tower 4, by help of weld seams between respective flange surfaces of the flanges 26 at the working platform 6, on the one hand, and the flanges 26 of the tower 4, on the other hand.

Figure 3:
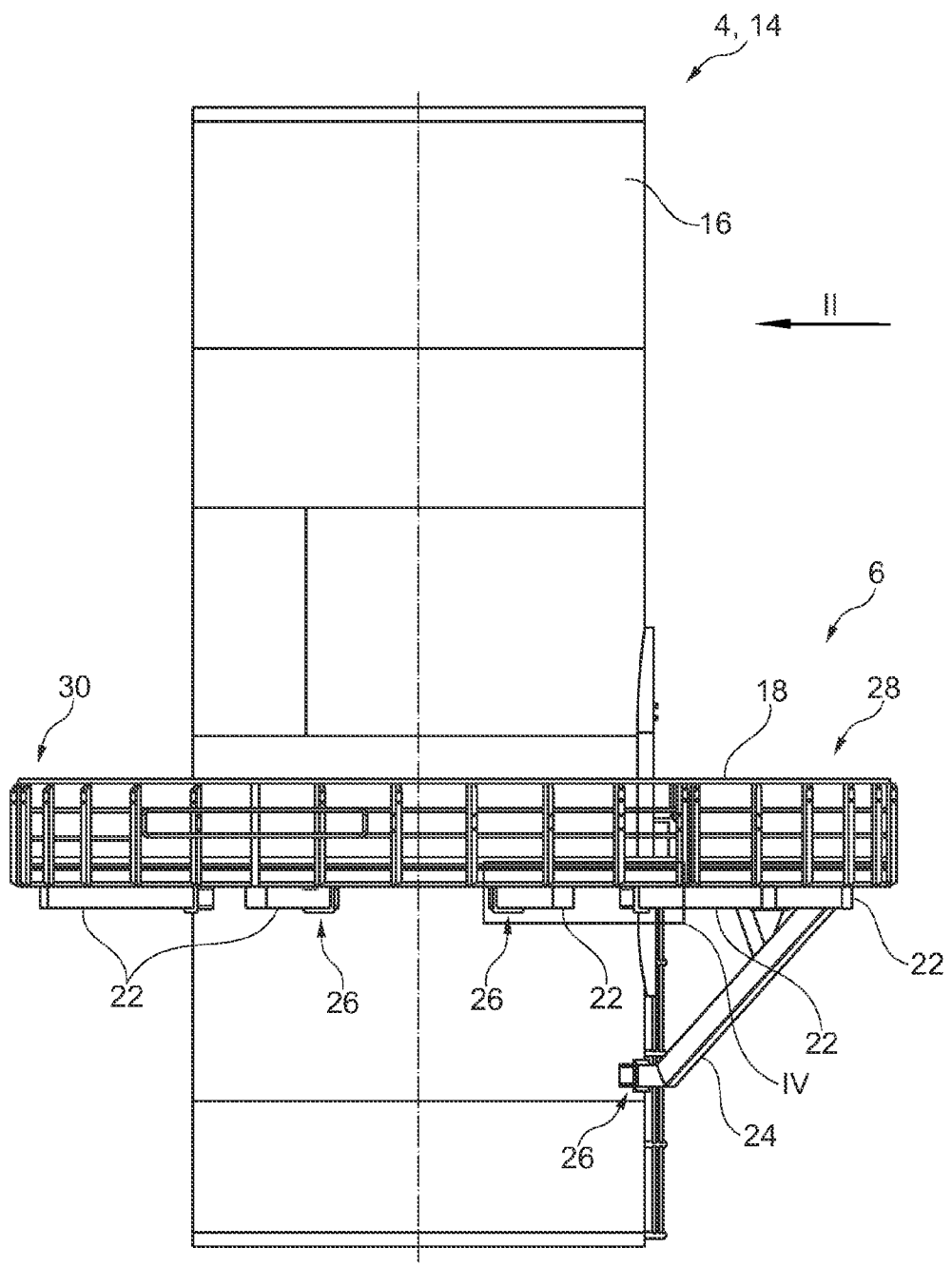

FIG. 3 is a further simplified detailed view showing a tower segment 14. FIG. 2 and FIG. 3 show the tower segment 14 from perpendicular viewing angles. The viewing direction of FIG. 2 is denoted in FIG. 3 by help of the arrow labeled "II" and the viewing direction of FIG. 3 is denoted in FIG. 2 by the arrow labeled "III".

The working platform 6 comprises a reinforced platform segment 28 having a plurality of radial beams 22 and—by way of an example only—two support beams 24 (see FIG. 2). The reinforced platform segment 28 is located at the right-hand side of FIG. 3. At the left-hand side of FIG. 3, there is a normal platform segment 30 of the working platform 6 which means that the normal segment 30 is not reinforced and solely supported by the radial beams 22. Preferably, the radial beams 22 and the support beams 24 are hollow section steel beams.

Figure 4:
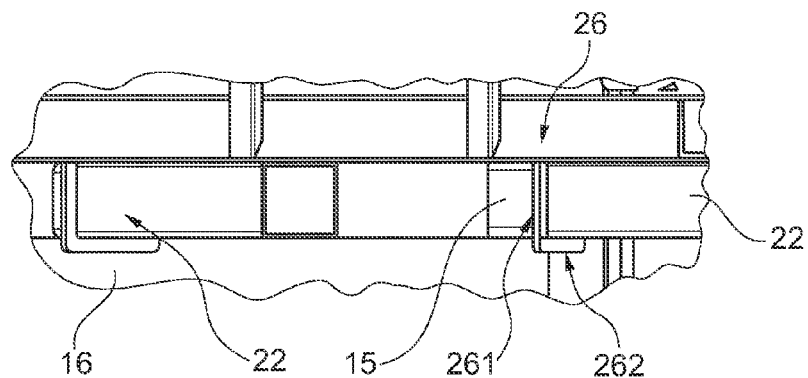
FIG. 4 is an outtake of FIG. 3 showing a simplified detailed view to radial beams of a working platform, according to an embodiment of the invention.

The welded joints between the flange surfaces of the flanges 26 of the radial beams 22 and the fixed flanges 26 of the tower 4 are shown in a more detailed view of FIG. 4, which is an outtake of FIG. 3. The outtake section is indicated by a rectangle referenced "IV" in FIG. 3.

In FIG. 4, there is a first fixed flange 261 which is mounted, e.g. welded, to the wall 16 of the tower 4 via a stud 15. The first flange 261 comprises a first flange surface facing respective flange surface of the adjacent second flange 262 of the working platform 6. The second flange 262 is mounted, e.g. welded, to the radial beam 22 of the working platform 6. The first and second flange surfaces are connected by a weld seam and consequently a load-carrying welded joint between the working platform 6 and the tower 4 is provided. The studs 15 also allow having a position for separating the working platform 6 from the tower 4 in a clean way if needed. For example, this may be the case, if a platform segment 28, 30 gets severely damaged during transportation or installation.

The working platform 6 and the tower segment 14 have an anti-corrosion surface coating which complies with the corrosion protection specifications of the wind energy plant 2. The anti-corrosion coating may be a suitable paint or plating, e.g. a hot-dip zinc coat. The anti-corrosion coating may be applied to the respective parts of the wind energy plant 2 at the production site. Accordingly, modern high quality surface coating technology may be applied. The only part of the tower segment 14 and the working platform 6 which has no anti-corrosion coating is the first and second flange surface 262, 264 of the first and second flange 261, 263 of the tower segment 14 and the working platform 6 (i.e. the radial beam 22 of the working platform 6), respectively. During assembly of the working platform 6, the only surface which is bare of an anti-corrosion coating, is the welded seam between the first and second flange surface 262, 264. The welded seam may be treated by suitable techniques in order to provide an anti-corrosion protection according to the anti-corrosion specifications, for example a suitable painting process. In praxis, first, the oxidation is removed from the welding area. The welding area is subsequently cleaned and grounded. Further, an intermediate coating and two layers of paint may be applied. As the welded joint is in the splash-zone where seawater particles can reach the welding, it has to withstand the highest corrosion standards, e.g. DIN C5M (wherein C5 is the highest class, and M stands for maritime). All suitable welding techniques may be applied to this assembly. This includes welding techniques with and without filling metal, including friction stir welding. In an embodiment (not shown), a friction stir welding device which is adapted to be fixed on the tower 4 and/or the working platform 6 may be applied. In order to perform the welding operation of the first and second flange 261, 262, the flange may be pressed together in a suitable way.

Figure 5:
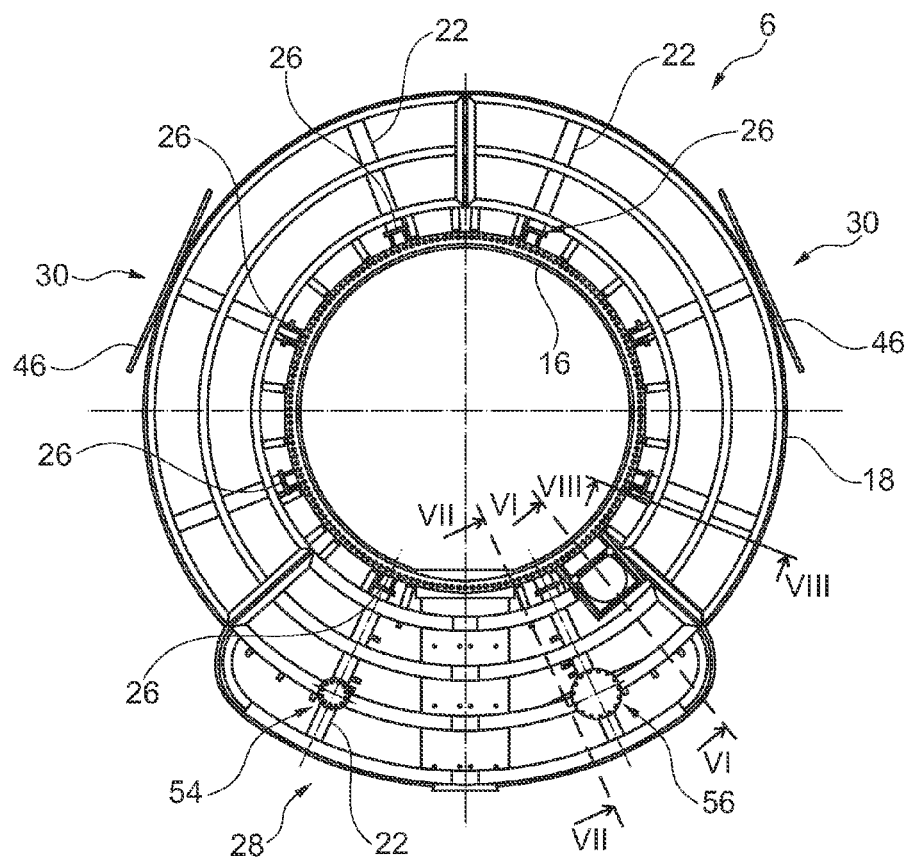
FIG. 5 is a simplified top view showing a working platform, according to an embodiment of the invention.

FIG. 5 is a simplified top view showing a working platform 6 according to another embodiment of the invention. The working platform 6 comprises a reinforced platform segment 28 and two normal segments 30, by way of an example only. The platform segments 28, 30 of the working platform 6 are fixed to the wall 16 of the tower segment 14 by welded connections at the flanges 26. The normal segments 30 are welded to the tower 4 at the radial beams 22 only. The reinforced platform segment 28 is welded to the tower segment 14 by welded joints at the radial beams 22 and additional support beams 24 (not visible). For signaling the position of the wind energy plant 2 to the maritime traffic, the working platform 6 comprises beacon fires 46 at the security handrail 18.

The reinforced platform segment 28 further comprises a first and a second crane support 54, 56, for fixing cranes thereon. The first crane support 54 is for mounting a manual driven auxiliary crane 38, the second crane support 56 is for mounting a hydraulic marine crane 40 thereon. The crane supports 54, 56 are advantageously fixed on those radial beams 22 of the reinforced platform segment 28 which comprises support beams 24. Accordingly, the crane lifting capacities, especially for the hydraulic marine crane 40 can thus be higher.

Figure 6:
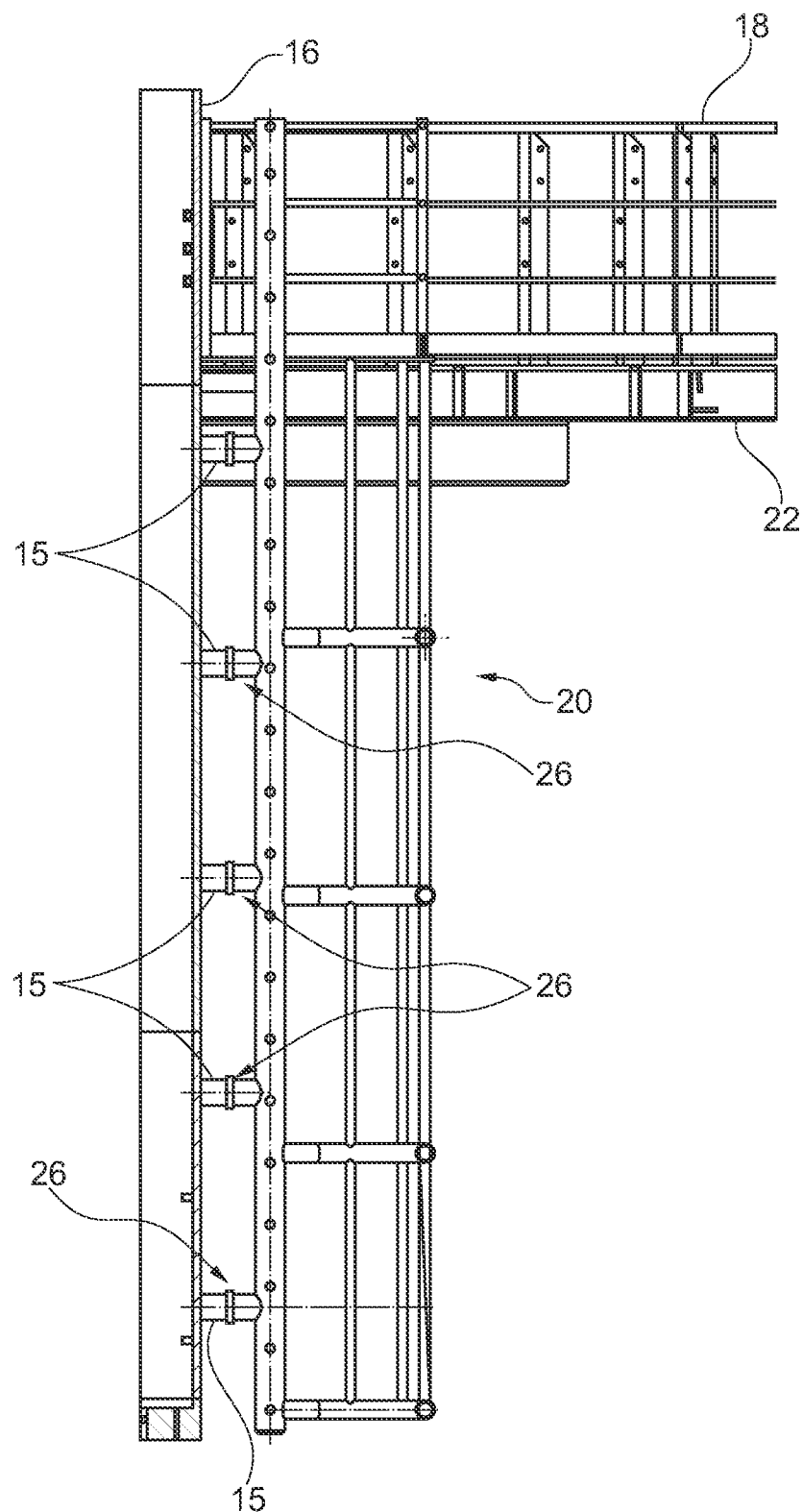
FIG. 6 is a simplified cross-sectional view along line VI-VI in FIG. 5 showing an ascending ladder.

FIG. 6 is a simplified cross-sectional view along the line VI-VI in FIG. 5. There is an ascending ladder 20 which is fixed to the wall 16 of the tower segment 14 via welded joints at further fixed flanges 26. The ascending ladder 20 may be pre-welded and coated with an anti-corrosion coating in a same way like the platform segments 28, 30. Advantageously, the ascending ladder 20 is integrated into the anti-corrosion concept of the wind energy plant 2. Solely the welded seams at the fixed flanges 26 have to be coated with an anti-corrosion layer after the assembly of the ascending ladder 20.

Figure 7:
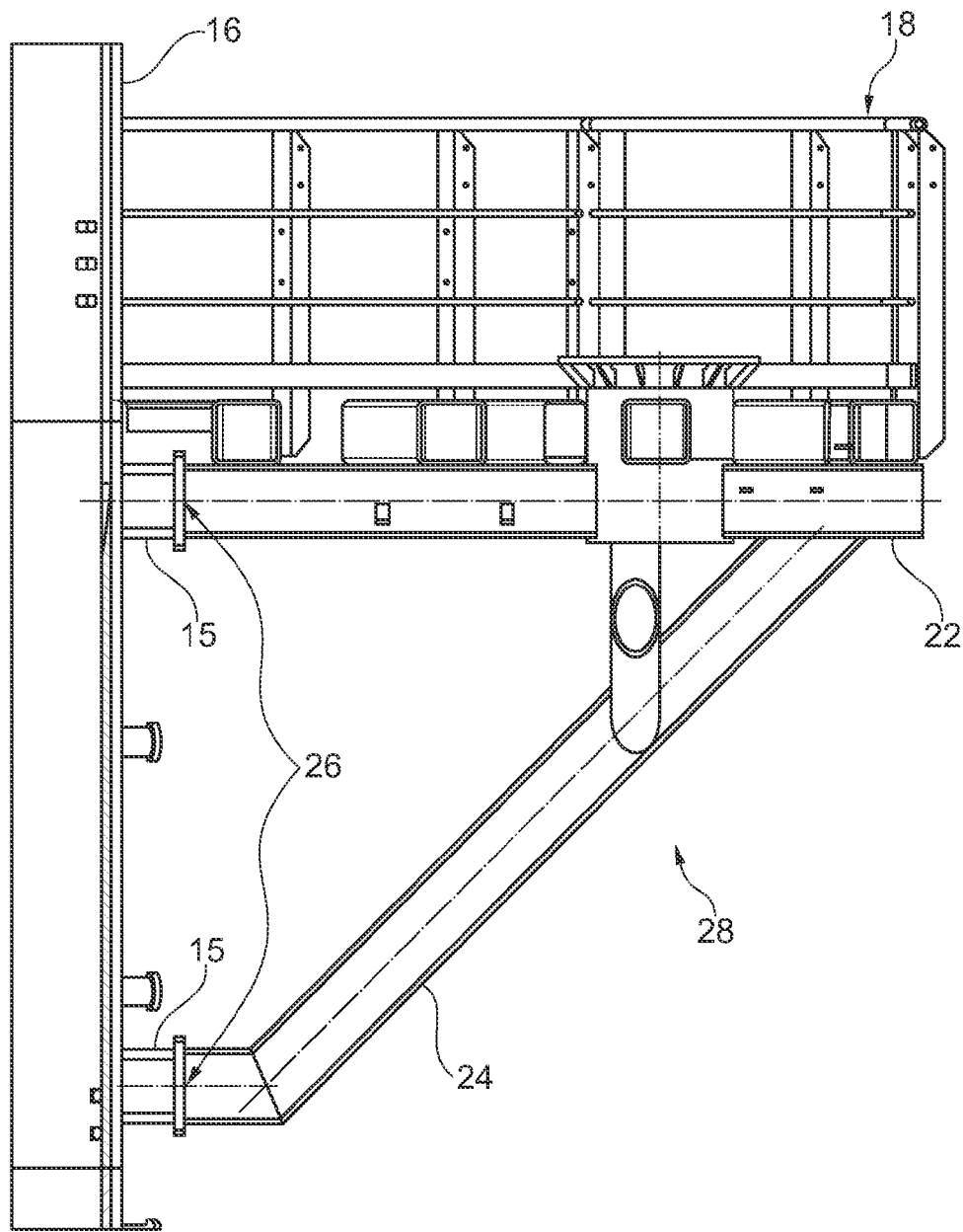
FIG. 7 is a simplified cross-sectional view along line VII-VII in FIG. 5 showing a reinforced platform segment.

FIG. 7 is a simplified cross-sectional view along the line VII-VII in FIG. 5, showing a cross-sectional view to the reinforced platform segment 28. The radial beam 22 and the support beam 24 are welded to the wall 16 of the tower segment 14 at the fixed flanges 26.

Figure 8:
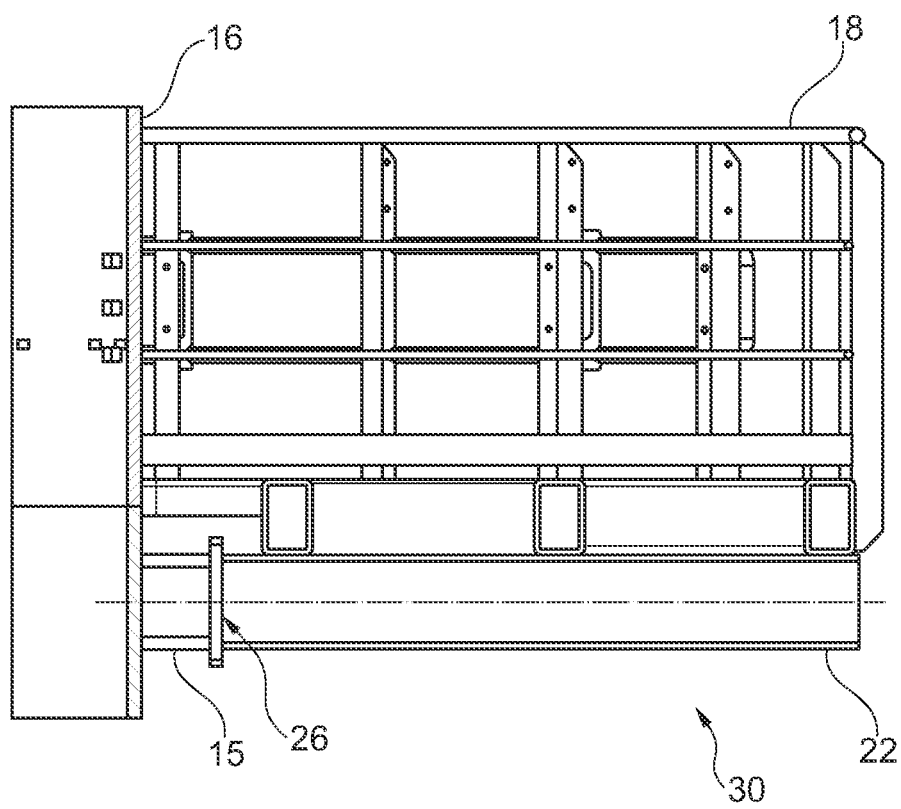
FIG. 8 is a simplified cross-sectional view along line VIII-VIII in FIG. 5 showing a normal (not reinforced) platform segment.

FIG. 8 is a simplified cross-sectional view along the line VIII-VIII in FIG. 5. A normal platform segment 30 is shown. The platform segment 30 is supported by the radial beams 22 which are mounted to the wall 16 of the tower segment 14 at fixed flanges 26 only. Due to the load-bearing welded joint, the load-carrying structure of the normal platform segments 30 is very simple. Further supporting beams may be omitted and the platform segment 30 may be constructed in that the radial beams 22 are the only supporting beams.

Figure 9:
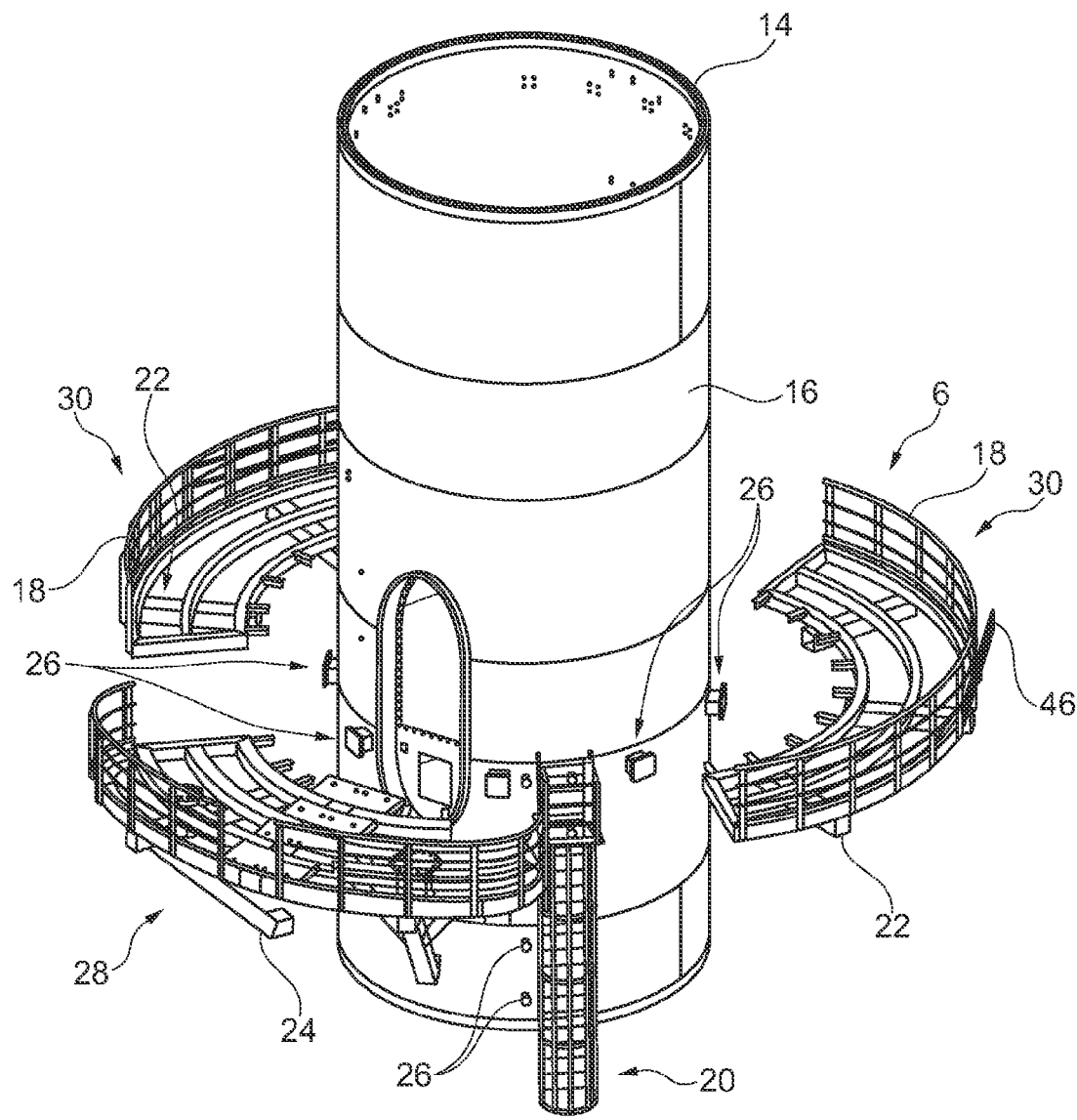
FIG. 9 is a simplified, perspective and exploded view showing a tower segment and a working platform, according to an embodiment of the invention.

FIG. 9 is a simplified, perspective and exploded view showing a tower segment 14 and a working platform 6 according to an embodiment of the invention. There is a plurality of fixed flanges 26 at the wall 16 of the tower segment 14. The normal platform segments 30 are fixed to the wall 16 of the tower segment 14 by welding their radial beams 22 to the respective fixed flanges 26 at the tower segment 14. The reinforced platform segment 28 comprises additional support beams 24 which are welded to suitable fixed flanges 26 at the wall 16 of the tower segment 14. The ascending ladder 20 is fixed to suitable flanges 26 having a smaller load-bearing capacity if compared to the fixed flanges 26 for the normal and reinforced platform segments 30, 28 at the wall 16 of the tower segment 14.

Figure 10:
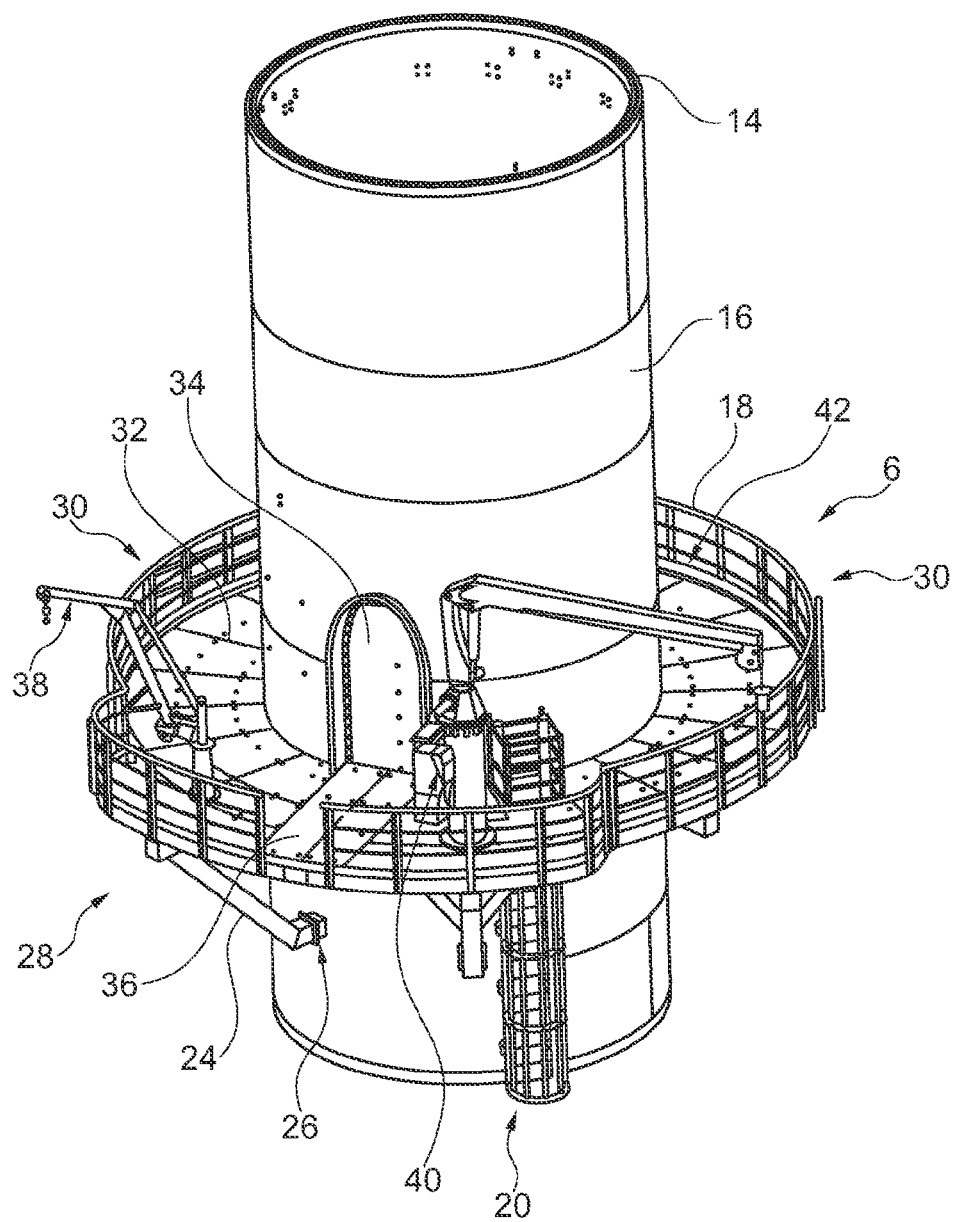
FIG. 10 is a tower segment and a working platform which is mounted to the tower segment in a simplified perspective view.

FIG. 10 is a simplified perspective view showing a tower segment 14 and a working platform 6 according to an embodiment of the invention. The working platform 6 is fully equipped and mounted on the tower segment 14. A plurality of checker plates 32 serve as walk-on-able base plates on the platform segments 28, 30. At least one of these base plates, according to the embodiment in FIG. 10, the two base plates in front of the tower door 34, may be removable. The reinforced platform segment 28 is designed to take up a heavy load track system instead of these removable base plates 36. This may be advantageous, especially for exchange of a transformer which is located inside the tower segment 14. The reinforced platform segment 28 further comprises a manual driven auxiliary crane 38 and a hydraulic marine crane 40 for carrying heavy loads. There is a cable channel 42 surrounding the working platform 6 at its outer perimeter near to the foot of the handrail 18. This may be advantageous for providing electric power to the different units of the working platform 6.

Figure 11:
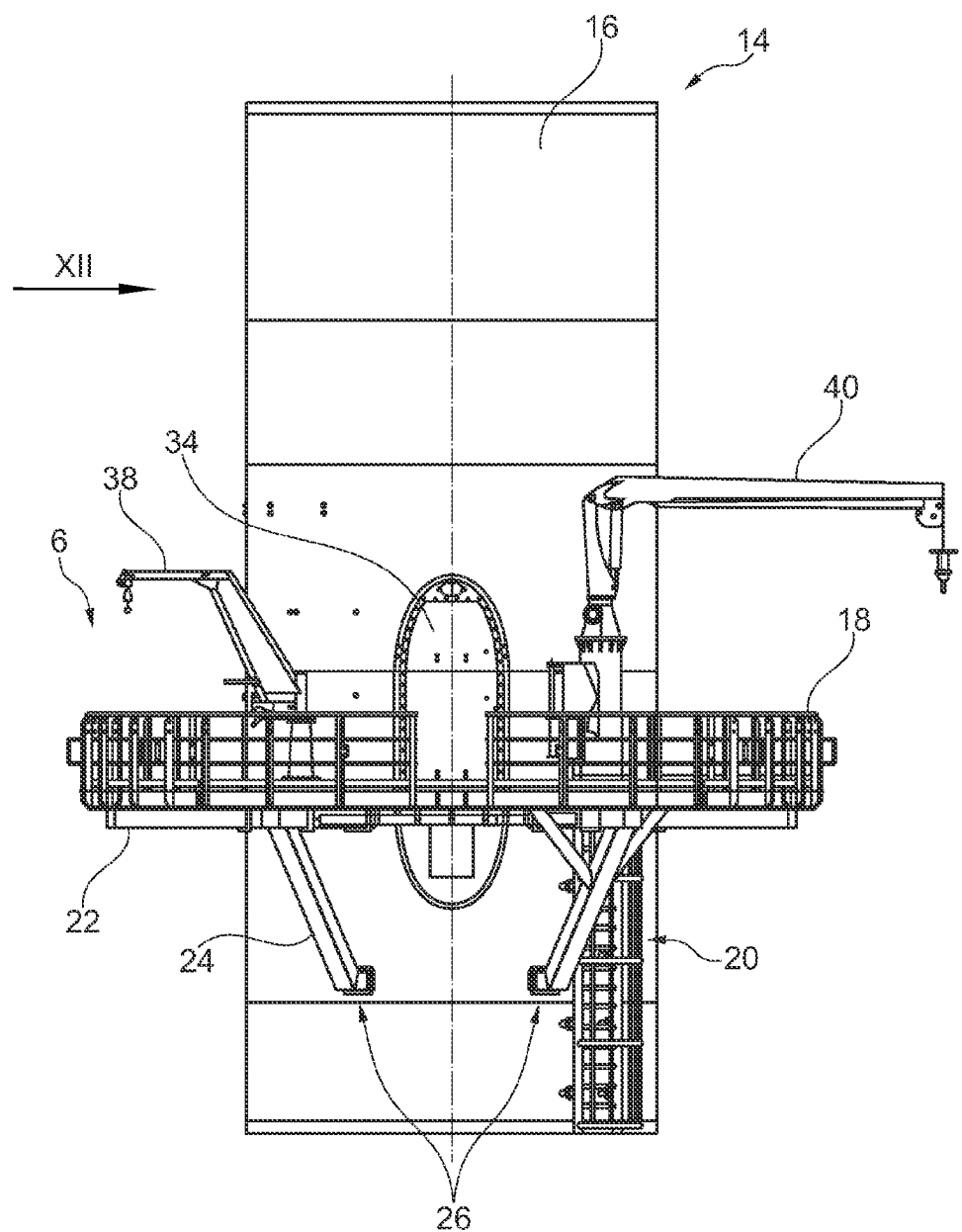
FIGS. 11 and 12 are simplified side views showing the tower segment and the working platform mounted thereto, according to the embodiment of FIG. 10 and FIGS. 13 to 21 are simplified perspective views showing a working platform and an inside structural system of a tower (the tower itself is omitted), illustrating the retrofitting of the working platform and the inside structural system of the tower for moving out a transformer from the interior of the tower to a reinforced platform segment, according to another embodiment of the invention.
Figure 12:
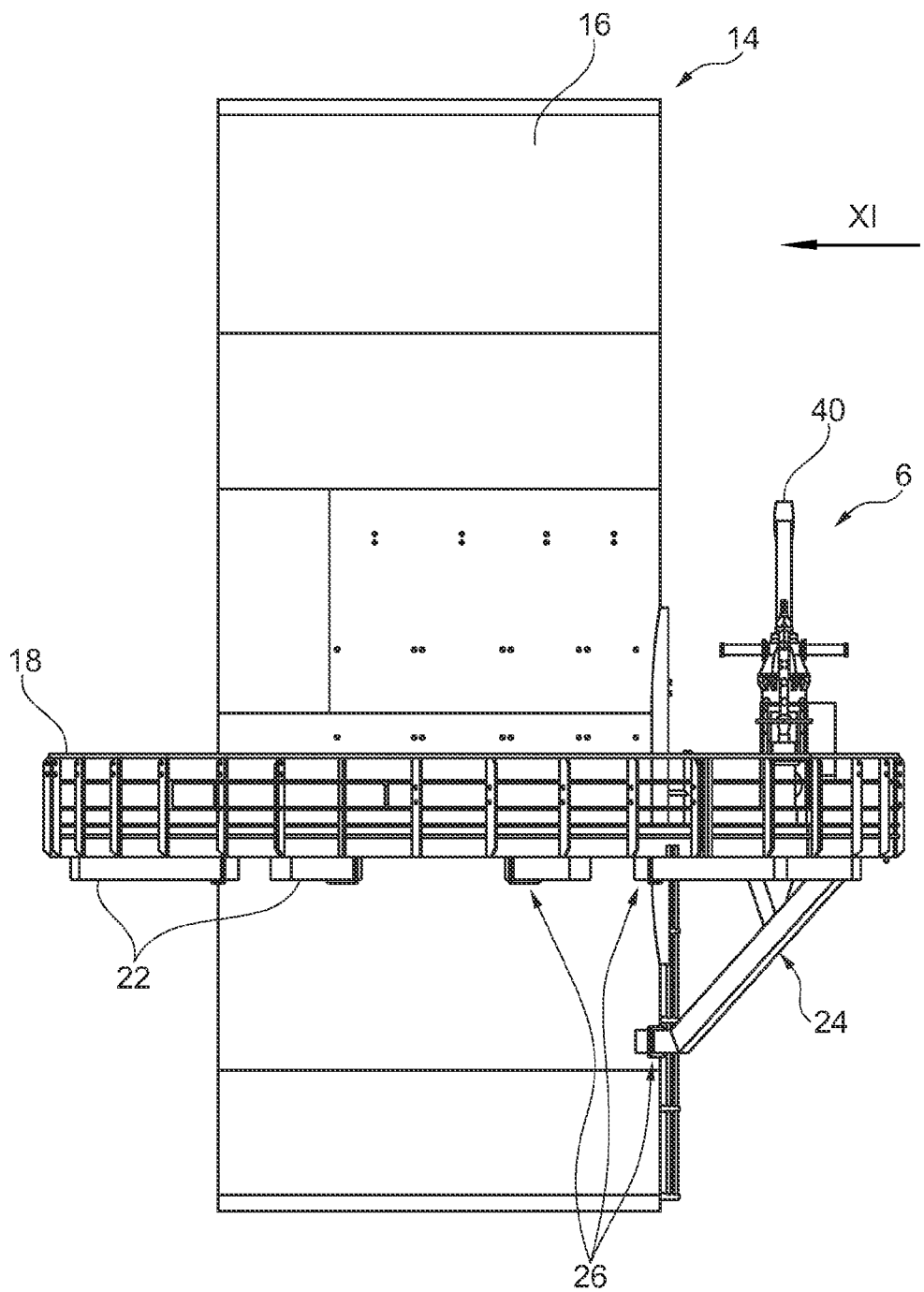

FIGS. 11 and 12 are further simplified side views showing the tower segment 14 and the working platform 6 according to the embodiment of FIG. 10. The viewing angles of FIGS. 11 and 12 are perpendicular. The viewing direction of FIG. 11 is denoted in FIG. 12 by help of the arrow labeled "XI" and the viewing direction of FIG. 12 is denoted in FIG. 11 by the arrow labeled "XII".

FIGS. 13 to 21 are simplified perspective views showing the working platform 6 and an inside structural system of the tower 4, wherein the tower segment 14 itself is omitted in the figures.

Figure 13:
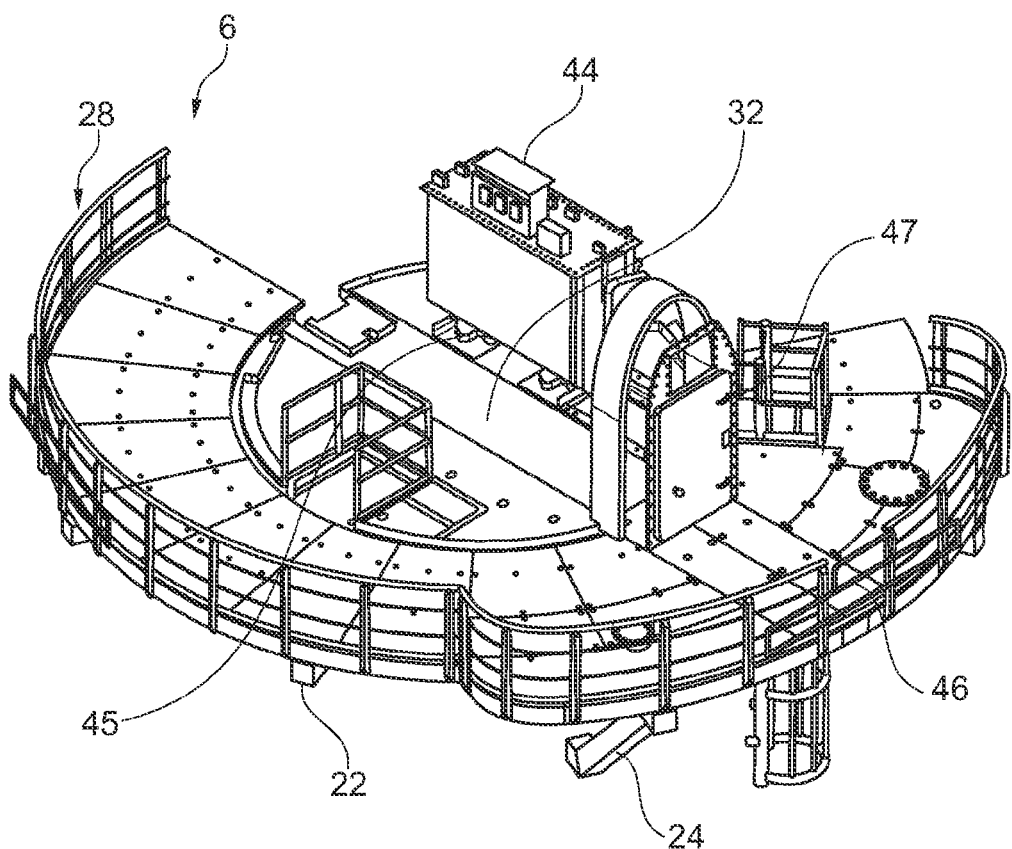

FIG. 13 shows an initial situation, wherein a transformer 44 represents a heavy load which is located inside the tower 4. The transformer 44 may be lifted up by suitable hydraulic units 45. The walk-on-able checker plates 32 inside the tower 4 may be removed (see FIG. 15). Further, a beacon fire 46 is mounted to the working platform 6, signaling the position of the wind energy plant 2 to the nautical traffic. This signaling device may be removed, too.

Further, there is a door assembly 47 which is mounted e.g. by bolts on a flange which is welded to the tower 4. In FIG. 13, the door assembly 47 is spaced apart from the tower 4. During removal or installation of the transformer 44, the complete door assembly 47 may be removed by unbolting it away from the tower 4. In normal operation, the door is needed for service personal and for conveying tools inside the tower 4. However, during removal or installation transformer 44, a bigger access opening to the tower 4 may be needed. This is why a removable door assembly may be fitted, in order to have a bigger opening to move the transformer 44 in or out of the tower 4 if needed.

Figure 14:
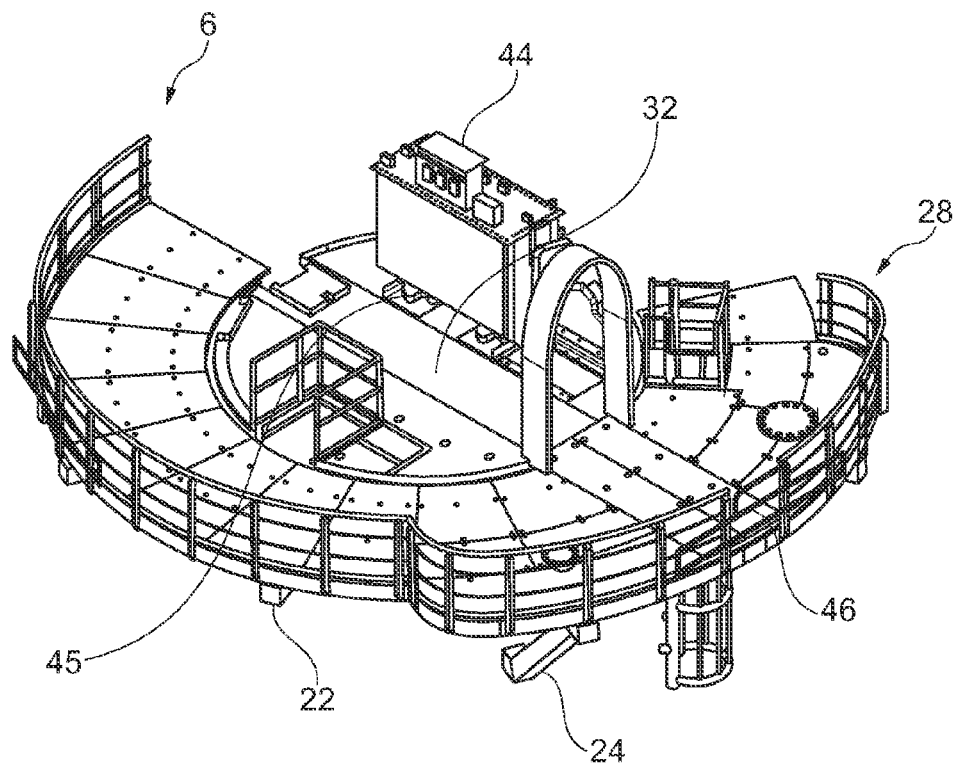
Figure 15:
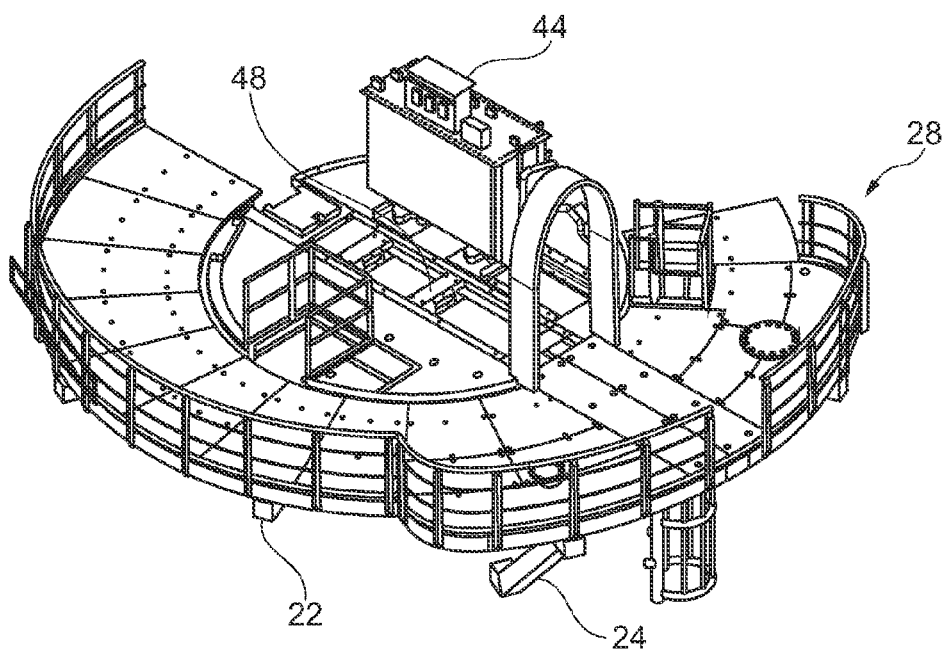
Figure 16:
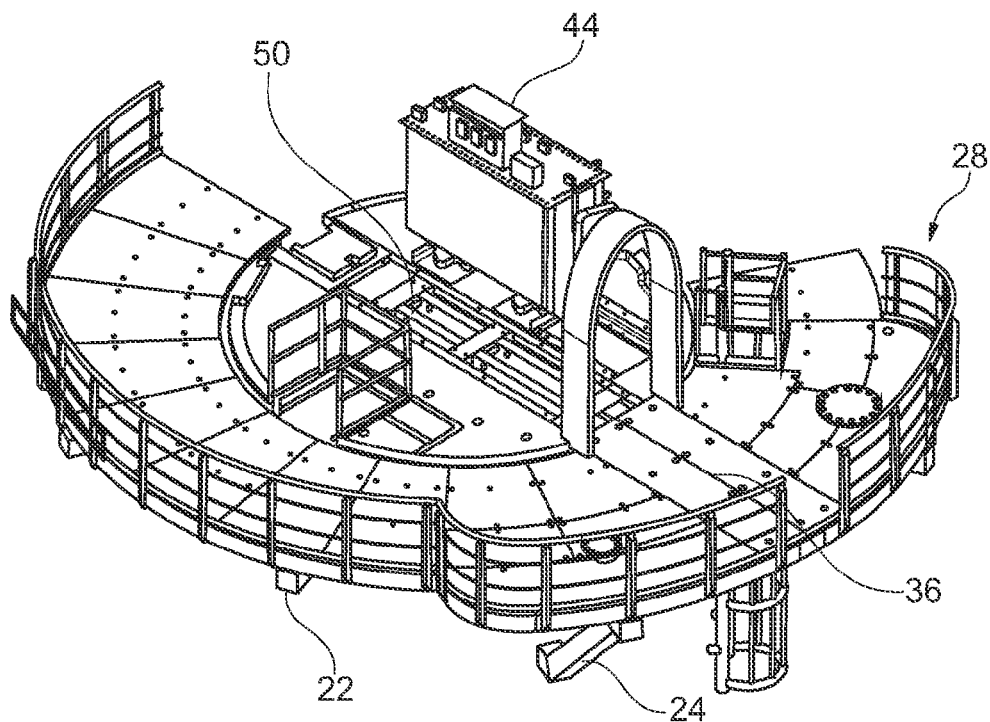
Figure 17:
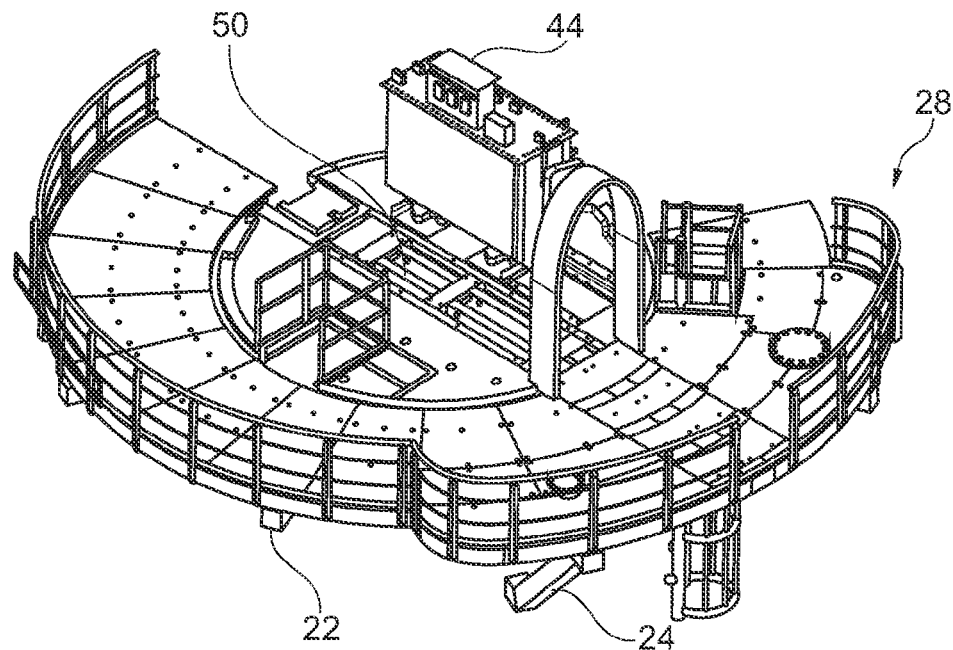
Figure 18:
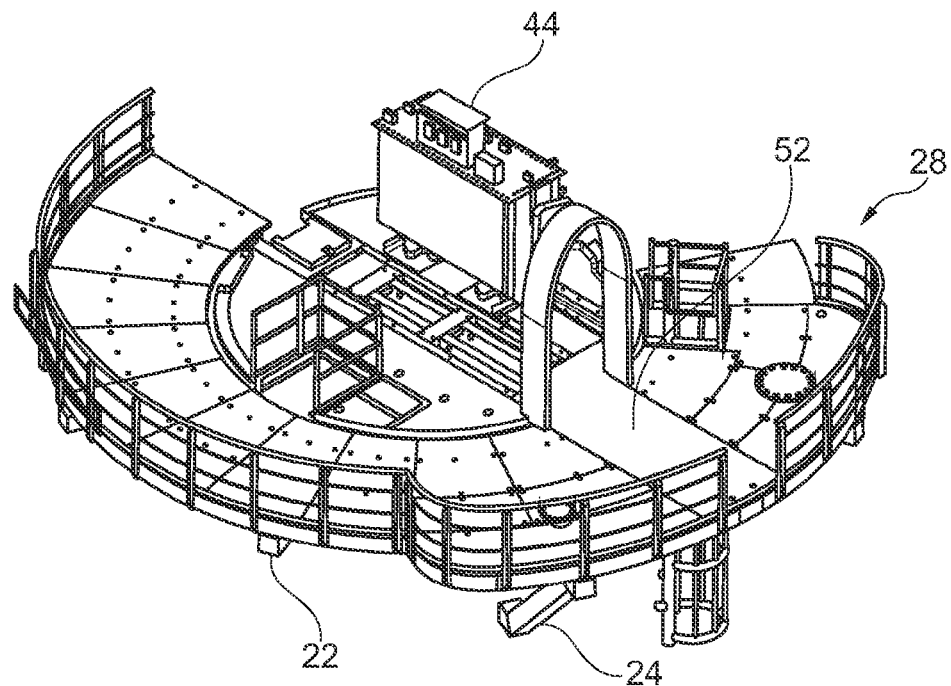
Figure 19:
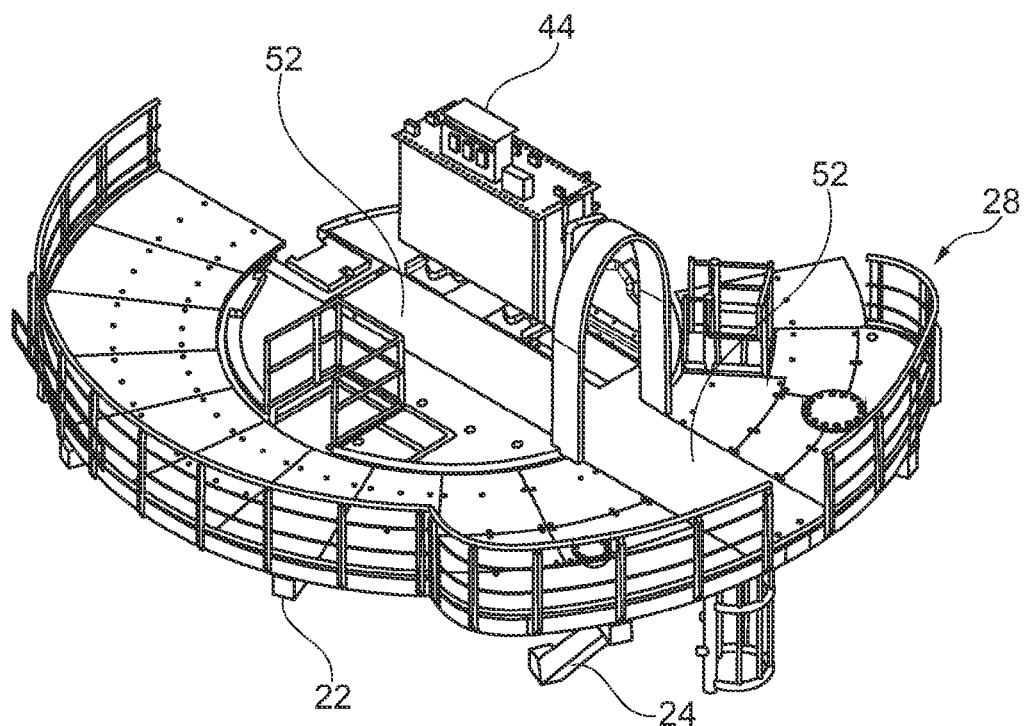
Figure 20:
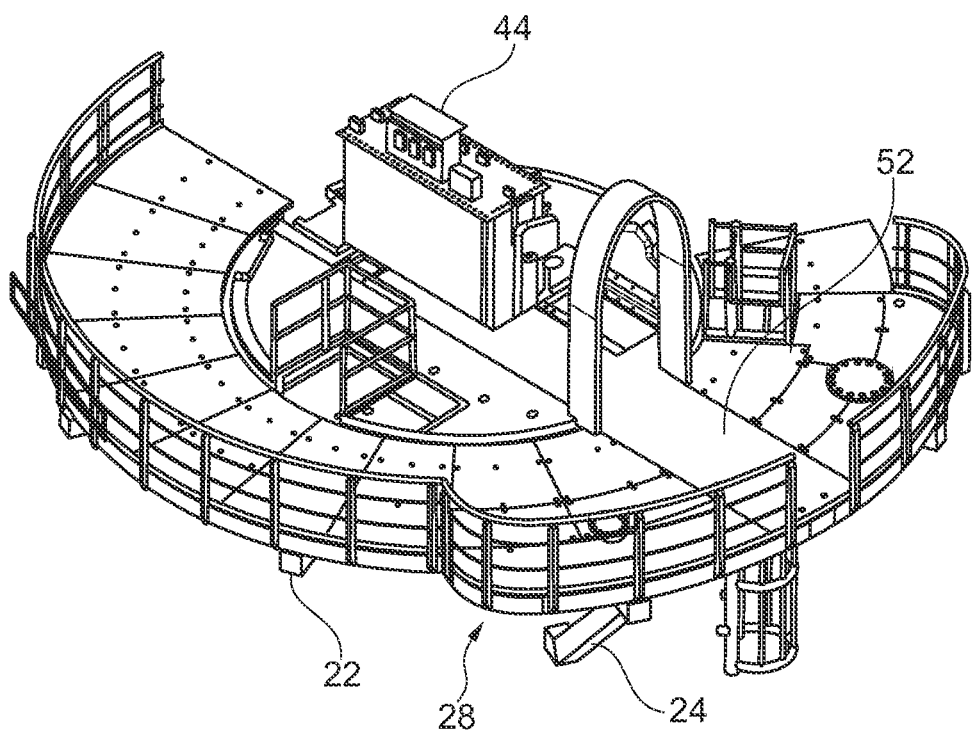
Figure 21:
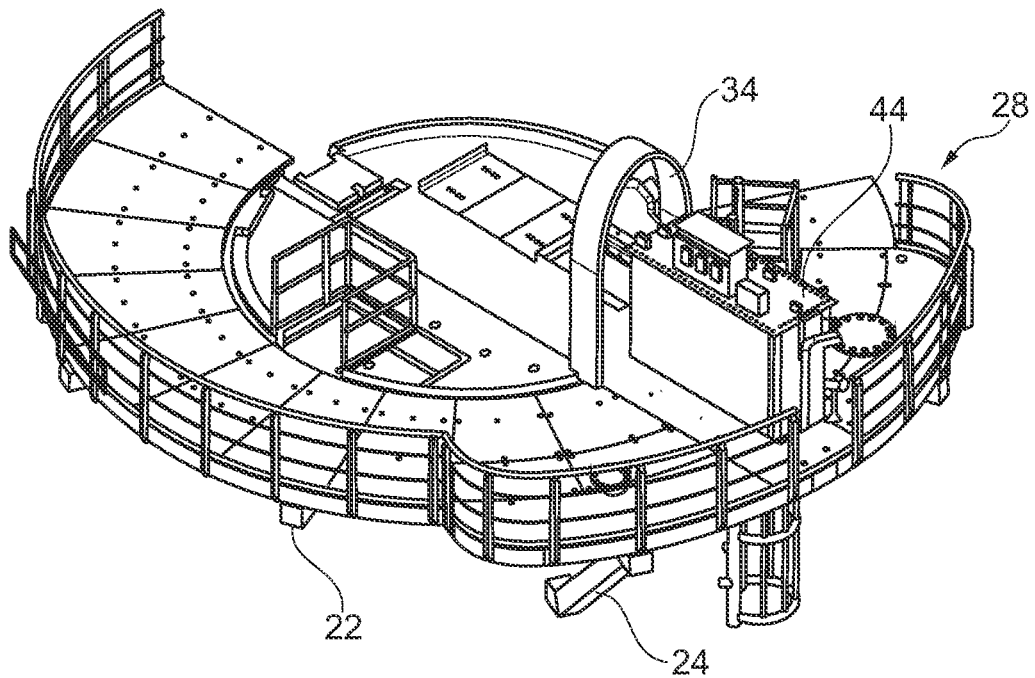

In FIG. 14, the door assembly has been removed. In FIG. 15, further, the beacon fire 46 and the checker plates 32 are removed and the transformer 44 is lifted. In order to reinforce the internal structural system 48 of the tower 4, auxiliary heavy load beams 50 may be inserted in this structural system 48, as it is illustrated in FIG. 16. Further, the removable base plates 36 at the reinforced platform segment 28 may be removed and an outside portion of a heavy load track system 52 may be mounted (see FIGS. 17 and 18). Additionally, the heavy load track system 52 extends inside of the tower 4 (see FIG. 19) and accordingly there is a heavy load track system 52 for the transformer 44 ranging from the inside of the tower 4 to the reinforced platform segment 28. Subsequently, the transformer 44 is shifted to the central portion of the tower 4 and is set to the internal part of the heavy load track system 52 (see FIG. 20). The transformer may be shifted to the reinforced platform segment 28 through the door 34 of the tower 4 (see FIG. 21). Now, the transformer 44 may be supplied to a suitable carrier, e.g. a service ship for maintenance, upgrade or replacement of the transformer 44.

Alternatively, according to an embodiment that is not shown, the tower 4 can be provided with only one working platform segment 28, 30 instead of three segments. This platform segment 28, 30 may be reinforced or not. The modular concept applies to two, three or more platform segments 28, 30, depending on the wind turbine tower 4 size and customer/production requirements.

Additionally, a 360°—working platform concept may be a part of the rescue concept of the wind turbine 2. Such a working platform 6 allows hoisting people down from the nacelle in case of emergency regardless the angle position of the nacelle with respect to the tower 4. This aspect may be the reason for providing normal "lightweight" platform segments 30 additionally to the reinforced platform segment 28.

Although the invention has been described hereinabove with reference to specific embodiments, it is not limited to these embodiments and no doubt further alternatives will occur to the skilled person that lie within the scope of the invention as claimed.

The invention claimed is:

1. An offshore wind energy plant comprising a working platform (6) and at least one tower segment (14), characterized in that the working platform (6) is configured to be mounted on an outside wall (16) of the tower segment (14) of the offshore wind energy plant (2) by help of welded joints,
the working platform comprising a plurality of pre-welded platform segments (28, 30),
wherein the tower segment (14) comprises fixed flanges (26) which correspond to fixed flanges (26) at the working platform (6) and which are for connecting the working platform (6) and the tower segment (14) by help of welded joints and the fixed flanges (26) are mounted to the outside wall (16) of the tower segment (14) via studs (15).

2. The offshore wind energy plant according to claim 1, wherein the platform segments are configured to have different load-bearing capacities.

3. The offshore wind energy plant according to claim 2, wherein at least one of the platform segments (28, 30) is a reinforced platform segment (28) and is configured to have a higher load-bearing capacity in comparison to further platform segments (30) of the working platform (6).

4. The offshore wind energy plant according to claim 3, wherein the reinforced platform segment (28) comprises walk-on-able base plates (32), and wherein at least one base plate (36) is removable and the reinforced platform segment (28) is configured to take up a heavy load track system (52) instead of the removable base plate (36).

5. The offshore wind energy plant according to claim 1, wherein a surface of the working platform (6), except for a flange surface (262, 264) of the fixed flanges (26), comprises an anti-corrosion coating.

6. The offshore wind energy plant (2) according to claim 4, wherein the heavy load track system (52) ranges from the reinforced platform segment (28) into an interior of the tower segment (14), and
wherein an inside structural system (48) of the tower segment (14) is constructed to be reinforced by insertion of heavy load beams (50) for carrying an internal portion of the heavy load track system (52).

7. A method of manufacturing an offshore wind energy plant (2) comprising a tower (4) and a working platform (6) having a plurality of platform segments (28, 30) which are mountable on a wall (16) of the tower (4), the method comprising the steps of:
a) pre-welding at least one platform segment (28, 30),
b) welding the at least one platform segment (28, 30) on an outside wall (16) of the tower (4) to build up a load-bearing welded joint,
the method further comprising:
c) mounting fixed flanges (26) to an outside wall (16) of the tower (4) via studs (15), and
d) welding corresponding fixed flanges (26) of the platform segment (28, 30) and the tower (4), in order to build up the load-bearing welded joint.

8. The method according to claim 7, further comprising the step of coating the surface of the at least one pre-welded platform segment (28, 30) with an anti-corrosion coating after pre-welding the platform segment (28, 30) and before welding the platform segment (28, 30) on the outside wall (16) of the tower (4).

9. The method according to claim 8, wherein the step of coating the surface of the platform segment (28, 30) with an anti-corrosion coating comprises: coating the surface of the platform segments (28, 30) and/or the tower (4), except for the surface of the fixed flanges (26), with the anti-corrosion coating.

* * * * *